(12) United States Patent
Brown et al.

(10) Patent No.: US 8,005,933 B2
(45) Date of Patent: Aug. 23, 2011

(54) PROBABALISTIC THROTTLING OF APPLICATION SERVER REQUESTS

(75) Inventors: Kyle Gene Brown, Apex, NC (US); Stacy Renee Joines, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1669 days.

(21) Appl. No.: 11/104,755

(22) Filed: Apr. 13, 2005

(65) Prior Publication Data
US 2006/0235991 A1 Oct. 19, 2006

(51) Int. Cl.
*G06F 15/173* (2006.01)
(52) U.S. Cl. ......... 709/223; 709/224; 709/225; 709/226
(58) Field of Classification Search .............. 709/223, 709/224, 225, 226, 235
See application file for complete search history.

(56) References Cited

U.S. PATENT DOCUMENTS

| | | | | |
|---|---|---|---|---|
| 5,996,011 | A * | 11/1999 | Humes | 709/225 |
| 6,055,578 | A | 4/2000 | Williams et al. | 709/253 |
| 6,219,712 | B1 | 4/2001 | Mann et al. | 709/235 |
| 6,222,856 | B1 * | 4/2001 | Krishnan et al. | 370/468 |
| 6,600,721 | B2 | 7/2003 | Edholm | 370/232 |
| 6,690,645 | B1 | 2/2004 | Aweya et al. | 370/230 |
| 6,751,668 | B1 * | 6/2004 | Lin et al. | 709/227 |
| 6,795,864 | B2 | 9/2004 | Connor | 709/232 |
| 6,799,276 | B1 | 9/2004 | Belissent | 713/201 |
| 6,961,341 | B1 * | 11/2005 | Krishnan | 370/412 |
| 7,032,048 | B2 * | 4/2006 | Appleby et al. | 710/240 |
| 7,106,696 | B1 * | 9/2006 | Lim et al. | 370/230.1 |
| 7,165,088 | B2 * | 1/2007 | Cohen et al. | 709/203 |
| 7,246,376 | B2 * | 7/2007 | Moharram | 726/23 |
| 7,254,609 | B2 * | 8/2007 | Hart et al. | 709/203 |
| 2002/0099829 | A1 | 7/2002 | Richards et al. | 709/227 |
| 2003/0023798 | A1 * | 1/2003 | Appleby et al. | 710/240 |
| 2003/0093499 | A1 * | 5/2003 | Messinger et al. | 709/219 |
| 2004/0002978 | A1 | 1/2004 | Wookey et al. | 707/10 |
| 2004/0249944 | A1 | 12/2004 | Hosking et al. | 709/225 |
| 2004/0253956 | A1 * | 12/2004 | Collins | 455/445 |
| 2005/0091389 | A1 * | 4/2005 | Qi et al. | 709/229 |
| 2005/0216471 | A1 * | 9/2005 | Yee et al. | 707/10 |
| 2006/0218279 | A1 * | 9/2006 | Yamaguchi et al. | 709/226 |
| 2006/0233108 | A1 * | 10/2006 | Krishnan | 370/235 |

* cited by examiner

*Primary Examiner* — Kevin Bates
*Assistant Examiner* — Mohammed Ahmed
(74) *Attorney, Agent, or Firm* — Steven M. Greenberg, Esq.; Carey, Rodriguez, Greenberg & Paul

(57) ABSTRACT

A servlet filter receives all incoming requests for dynamic content and can be used to ensure that the load on a server does not become too great during the time the server is engaged in start-up. The filter is configured to be the first filter encountered and will evaluate a series of conditions to determine if the request is to be throttled. For selected URLs, a given percentage of the first requests received after start-up are automatically throttled. If the request is throttled, a message is sent to the user that the server is busy but to try later. Servlets that are not throttled are allowed to flow through to be processed normally.

19 Claims, 3 Drawing Sheets

US 8,005,933 B2

PROBABALISTIC THROTTLING OF APPLICATION SERVER REQUESTS

BACKGROUND OF THE INVENTION

1. Technical Field

The present invention relates generally to websites and more specifically to managing a website. Even more specifically, the present invention relates to throttling all but a given number of requests directed to a website at the time the website is started up.

2. Description of Related Art

The Internet has become a cultural fixture as a source of both information and entertainment. Many businesses are creating Internet sites as an integral part of their marketing efforts, informing consumers of the products or services offered by the business or providing other information in order to engender brand loyalty. Many federal, state, and local government agencies are also employing Internet sites for informational purposes, particularly agencies that must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

An inherent problem with many websites is that they fail under heavy use, often because of memory allocation problems in the Java Virtual Machine (JVM) on which the application executes. There are several common solutions to this problem, including caching commonly used objects to reduce CPU and memory overhead and using object pooling of expensive objects such as database connections. However, the use of these solutions causes a different problem when the JVM is coming up. Creating and placing objects into caches and pools is a highly memory-intensive and CPU-intensive operation, while taking the objects out of the caches and pools is not. When a JVM is starting up, its caches and pools are empty, so that the system is utilizing large amounts of memory and CPU time at start-up to fill the caches. If the JVM crashed because of a heavy load which does not abate, the application running on the JVM can experience a heavy request load at the same time it is experiencing heavy memory and CPU usage filling the caches, which can cause the JVM to crash again.

Thus, it is desirable to protect the JVM from high loads while the caches are being populated, and then allow the load to ramp up over time as the cache and pools are filled. This spreads out the CPU load and heap utilization from a spike into a plateau and improves system stability as a result.

Existing implementations of load management on the JVM are generally performed upstream of the servlet engine—they perform weighting and throttling at the router level before the request ever arrives at the servlet engine. However, this is complicated to put in place and requires that one adds additional layers of software and hardware to accomplish this throttling in a network. It would be desirable to provide protection to the JVM without requiring an additional layer of hardware and software.

BRIEF SUMMARY OF THE INVENTION

The disclosed invention uses a simple filter that will intercept a request before it reaches its destination within the web server. The filter is placed on all incoming requests for dynamic content. The filter is preferably configured to be the first filter encountered and will evaluate a series of conditions to determine if the request is to be throttled. If the request will be throttled, the filter sends a message to the user that the server is busy but to try later. Requests that are not throttled are allowed to flow through to be processed normally.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
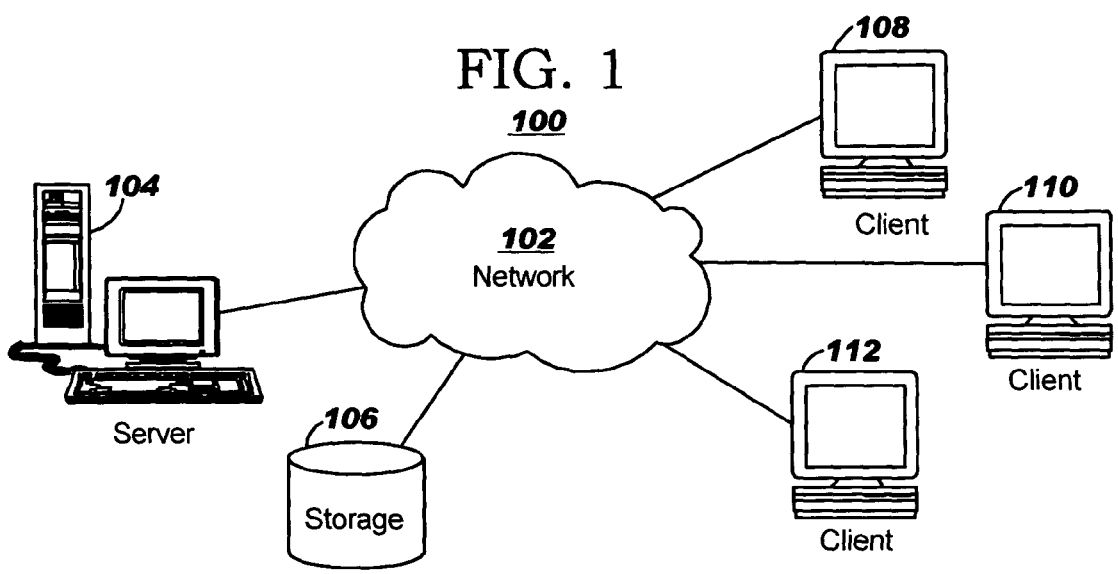
FIG. 1 depicts a network in which the present invention can be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
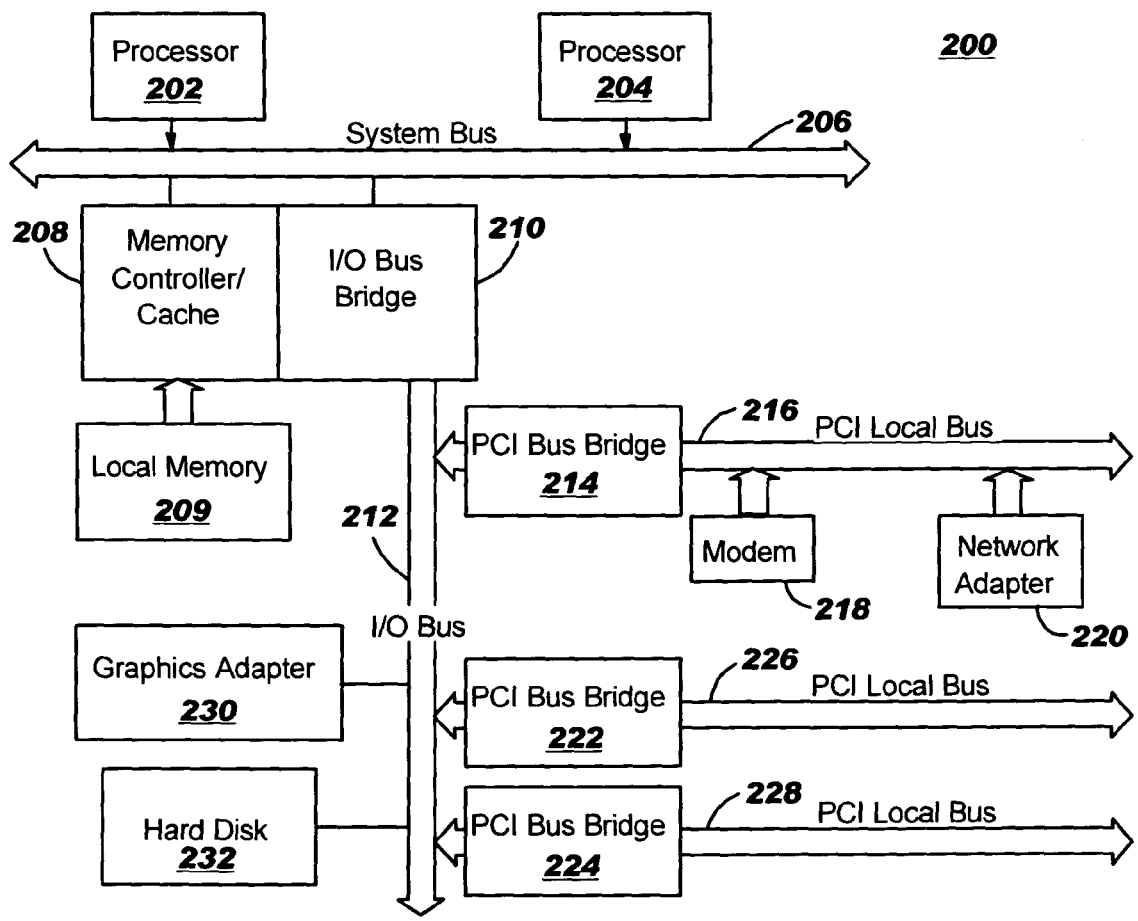
FIG. 2 depicts a server in which the present invention can be implemented.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
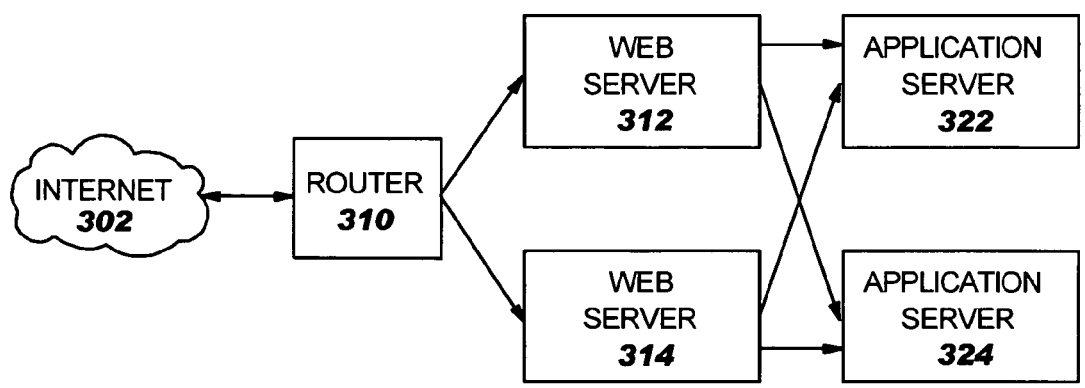
FIG. 3 depicts a group of servers that can service one or more websites, showing the flow of a request into the server (s), according to an exemplary embodiment of the invention.

With reference now to FIG. 3, a view is depicted of a group of servers that can service one or more websites, with the flow of a request into the server(s) shown. Requests are received at router 310 and sent to one of web servers 312, 314. From these two web servers 312, 314, a request can be sent to application servers 322, 324, where servlets will be invoked. Servlets are small programs that run on a server and can produce dynamic pages. In the presently preferred embodiment, these programs are Java servlets, running under Java Servlet Specification, version 2.3 or higher. Throttling of requests has previously been performed at the location of either router 310 or web servers 312, 314. In the present application, however, the throttling is performed in application servers 322, 324.

Figure 4:
FIG. 4 depicts the flow of a request in the JVM, according to an exemplary embodiment of the present invention.

Looking now at FIG. 4, the path of a request within an application server, such as application server 322, 324 is shown by the arrows. Java Servlet Specification, version 2.3 and above, allows the user to define filters to which requests for dynamic content are sent prior to reaching the actual servlet. The request must pass through any filters 402, 404 that have been created before it can reach its target 406, which is either a servlet or a Java Server Page (JSP). The output from the servlet or JSP travels by the same path back through any filters. It is desirable that the throttling filter be the first filter encountered, in order that requests that will be throttled do not receive unnecessary processing.

The concept used in the throttling filter in these illustrative examples is that the load will initially be limited to a percentage of the requests received; the percentage will be gradually increased as the caches and pools are filled, until finally all requests are passed through. For example, for the first 5,000 requests, only 20% will be passed. For the next 10,000 requests, 50% are passed through and for the next 10,000, 80% are passed through. Finally, after the first 25,000 requests, 100% will be passed through.

Preferably, the throttling will be applied on only a subset of servlets and JSPs in the application. This is done by modifying the Servlet deployment descriptor (web.xml). By careful selection of the servlets and JSPs to be subjected to throttling, the designer can cause the rejection process to be directed to users who are just arriving at the website, rather than users that are deep into an existing process. For example, the choice can be made to selectively throttle users going to a domain name of ibm.com, but to allow requests directed to ibm.com/webserver, since the former is more likely to be a new arrival at the website.

Figure 5:
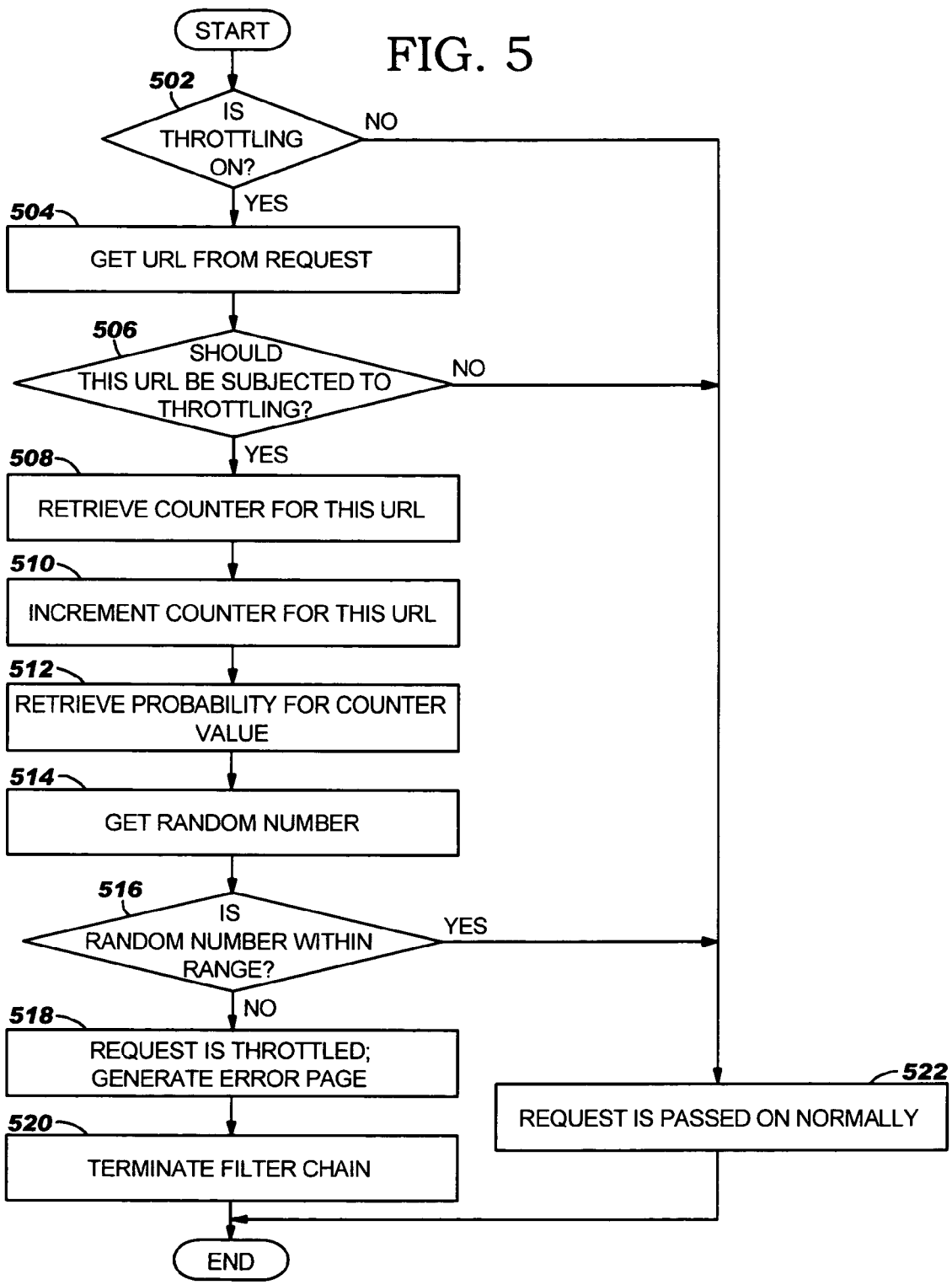
FIG. 5 shows a flowchart of the decisions made in a throttling filter, according to an exemplary embodiment of the invention.

With reference now to FIG. 5, a flowchart of the decisions taken in the throttling filter is shown, according to an illustrative embodiment of the invention. The first determination is whether or not the throttling is on (step 502). It is desirable to have the throttling capability turned on the majority of the time, since activity that could cause the server to crash is unpredictable. However, there can be special cases, such as during debugging or performance testing, when it is preferable to turn throttling off. If no throttling is being performed, the request will immediately be passed on normally (step 524), to the next filtering step, if present, or to the target. If throttling is turned on, the request will proceed through the throttling filter, where the Universal Resource Locator (URL) is retrieved from the request (step 504). The throttling filter then determines if the current URL is one on which throttling is applied (step 506). This can be determined, for example, by consulting a table containing a list of URLs for which throttling should be applied. If this URL is not subjected to throttling, the request will be passed to normal processing (step 524). If the URL is subjected to throttling, a counter for the URL is retrieved (step 508), and then the counter is incremented (step 510). When the JVM is restarted after a server crash, Java automatically resets any counters to zero, so that the counter will always contain the number of requests for this URL received since the JVM was restarted. The filter then retrieves the probability value associated with the value of the counter (step 512). Using the values suggested above, the probability value would be as follows:

| Counter value | Probability (%) |
|---|---|
| 1-5,000 | 20 |
| 5,001-10,000 | 50 |
| 10,001-20,000 | 80 |
| 20,001+ | 100 |

The filter can then determine if the request falls within the desired percentage of requests to be served at this point in time. For example, a random number generator can be used to generate a number from 1 to 100 (step 514). The number generated is then compared to the probability range above (step 516). If the value of the random number falls within the probability range, the request would be passed on normally (step 524); otherwise the request would be throttled (step 518). An error page is sent to the user, informing them that the server is busy, but to try again later and then the filter chain is terminated without ever reaching the servlet (step 520). This completes the execution of the filter.

As disclosed, the innovative filter will throttle a percentage of requests during the initial period of start-up to reduce the load on the server. Once the server has had time to fill its caches and pools, the filter remains in place, but will pass all requests without throttling. This mechanism allows a server to be protected during the time that it is most vulnerable to heavy loads, yet does so by a simple mechanism, without additional layers of router hardware and software.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of managing a server for a website, comprising the computer-implemented steps:
   receiving, from a user, a request for dynamic content on the website,
   retrieving a universal resource locator (URL) from said request;
   upon a determination that said URL is to be subjected to throttling,
      incrementing a counter associated with said URL,
      determining, according to a value of said counter, a percentage of requests to be passed, wherein the percentage has a value between 0% and 100% when a value of the counter is less than or equals to a pre-determined threshold value and the percentage has a value of 100% when the value of the counter is greater than the pre-determined threshold value,
      determining whether said request falls within said percentage of requests to be passed; and
   upon said request not falling within said percentage of requests to be passed, throttling said request.

2. The method of claim 1, wherein said method is performed in a servlet filter.

3. The method of claim 1, wherein said counter is reset if a server on which said method is performed crashes.

4. The method of claim 1, wherein said throttling said request includes sending a message to the user and terminating a chain of filters associated with said request.

5. The method of claim 1, further comprising consulting a table to determine whether said URL is to be subjected to throttling.

6. The method of claim 1, wherein a multiplicity of said requests are received, and said determining a percentage of requests to be passed comprises specifying
   a first percentage value,
   a second percentage value that is greater than said first percentage value, and
   a third percentage value that is greater than said second percentage value, wherein
   said first percentage value of the number of requests that are received are passed, until said number of received requests reaches a first prespecified number,
   after said number of received requests reaches said first prespecified number, said second percentage value of said number of said received requests are passed, until said number of received requests reaches a second prespecified number; and
   after said number of received requests reaches said second prespecified number, said third percentage value of said number of received requests are passed.

7. A computer program product on a computer-readable storage media, the computer-readable storage media including computer program for managing a server for a website, the computer program, when executed on a computer system, causes the computer system to perform the operations of:
   receiving, from a user, a request for dynamic content on the website,
   retrieving a universal resource locator (URL) from said request;
   upon a determination that said URL is to be subjected to throttling,
      incrementing a counter associated with said URL,
      determining, according to a value of said counter, a percentage of requests to be passed wherein the percentage has a value between 0% and 100% when a value of the counter is less than or equals to a predetermined threshold value and the percentage has a value of 100% when the value of the counter is greater than the pre-determined threshold value,
      determining whether said request falls within said percentage of requests to be passed, and
   upon said request not falling within said percentage of requests to be passed, throttling said request.

8. The computer program product of claim 7, further comprising
   determining whether a throttling capability is turned on prior to receiving the request from the user.

9. The computer program product of claim 7, wherein said computer program is executed in a servlet filter.

10. The computer program product of claim 7, wherein said counter is reset if a server, on which said computer program is running, crashes.

11. The computer program product of claim 7, wherein said throttling said request includes sending a message to the user and terminating a chain of filters associated with said request.

12. The computer program product of claim 7, further comprising
   consulting a table to determine whether said URL is to be subjected to throttling.

13. A server for a website, comprising:
   an input connection configured to receive requests for dynamic content;
   an output connection configured to send responses to said requests;
   a memory in which filtering instructions are stored, and
   a processor, connected to said input connection, said output connection, and said memory, said processor configured to execute the filtering instructions to perform the operations of receiving, from a user, a request for dynamic content on the website, retrieving a universal resource locator (URL) from said request;

upon a determination that said URL is to be subjected to throttling, incrementing a counter associated with said URL, determining, according to a value of said counter, a percentage of requests to be passed, wherein the percentage has a value between 0% and 100% when a value of the counter is less than or equals to a pre-determined threshold value and the percentage has a value of 100% when the value of the counter is greater than the pre-determined threshold value, determining whether said request falls within said percentage of requests to be passed, and upon said request not falling within said percentage of requests to be passed, throttling said request.

14. The server of claim 13, further comprising determining whether a throttling capability is turned on prior to receiving the request from the user.

15. The server of claim 13, wherein said filtering instructions are executed in a servlet filter.

16. The server of claim 13, wherein said counter is reset upon said server crashes.

17. The server of claim 13, wherein said throttling said request includes sending a message to the user and terminating a chain of filters associated with said request.

18. The server of claim 13, further comprising consulting a table to determine whether said URL is to be subjected to throttling.

19. The server of claim 13, wherein said server is an application server.

* * * * *